2 Sheets--Sheet 1.

S. S. STULTZ.
Harvester.

No. 164,055. Patented June 1, 1875.

Witnesses:
Edwin P. Goodwin
H. T. Lacey

Inventor:
Sidney S. Stultz.
By his Att. G. B. Towles.

THE GRAPHIC CO. PHOTO-LITH. 39 & 41 PARK PLACE, N.Y.

2 Sheets--Sheet 2.

S. S. STULTZ.
Harvester.

No. 164,055. Patented June 1, 1875.

Witnesses:
Edwin P. Goodwin
A. P. Lacey

Inventor:
Sidney S. Stultz.
By his Att. G. B. Towle

UNITED STATES PATENT OFFICE.

SIDNEY S. STULTZ, OF CEDAR BLUFFS, NEBRASKA.

IMPROVEMENT IN HARVESTERS.

Specification forming part of Letters Patent No. 164,055, dated June 1, 1875; application filed September 15, 1874.

*To all whom it may concern:*

Be it known that I, SIDNEY S. STULTZ, of Cedar Bluffs, in the county of Saunders and State of Nebraska, have invented certain new and useful Improvements in Harvesters; and I do hereby declare the following to be a full, clear, and exact description of the invention, such as will enable others skilled in the art to which it pertains to make and use it, reference being had to the accompanying drawings, which form part of this specification.

Figure 1:
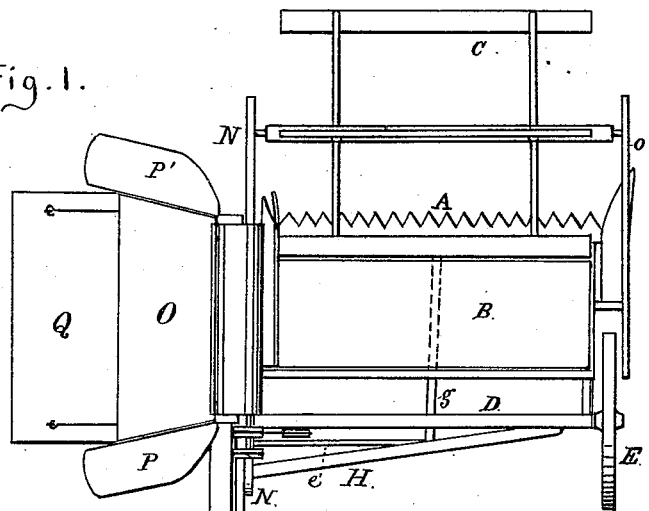
Figure 6:
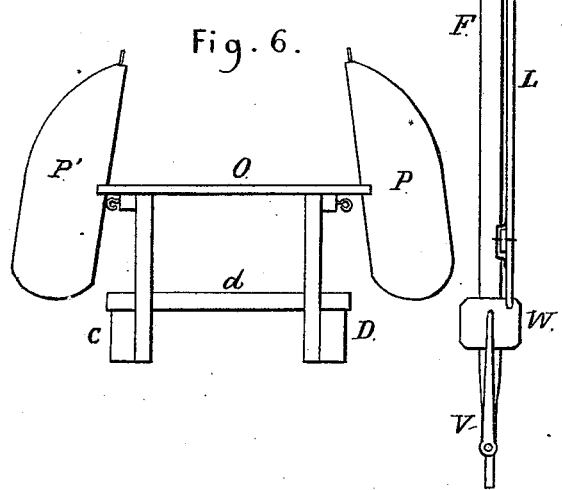
Figure 5:
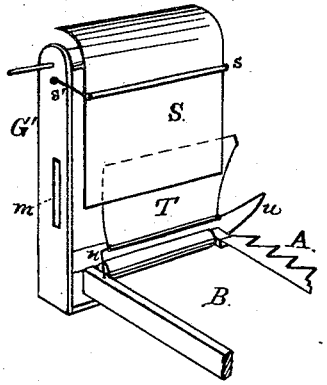
Figure 2:
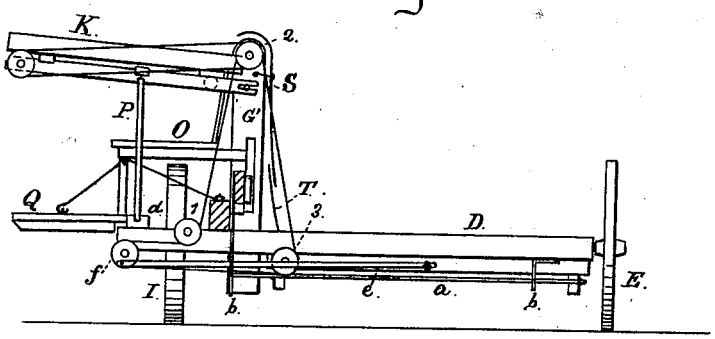
Figure 3:
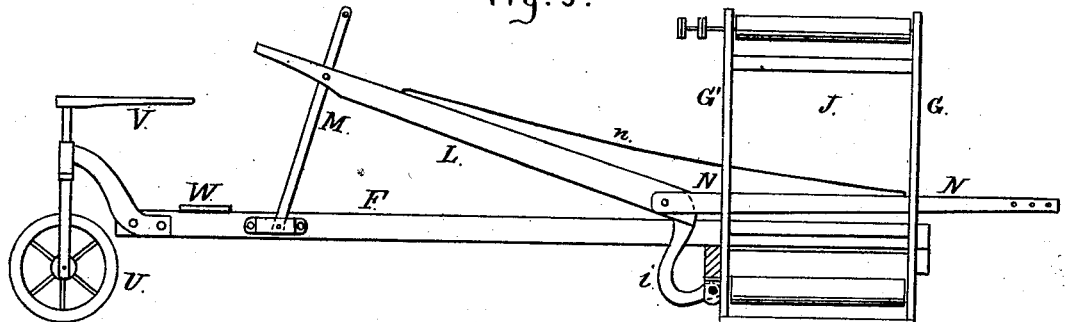
Figure 4:
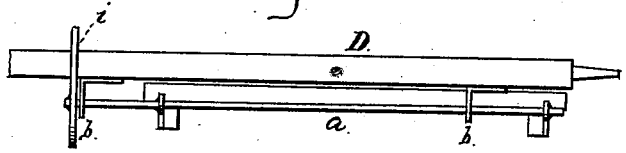

Figure 1 is a plan view of my improved harvester, showing grain-carrier removed. Fig. 2 is a rear view, showing grain-carrier attached. Fig. 3 is a longitudinal sectional elevation. Fig. 4 is a view of axle detached from the machine, showing hinged or pivotal rod. Fig. 5 is a perspective view of elevator. Fig. 6 is a side view, showing hinged tables placed in a vertical position for supporting grain-carrier.

Like letters in all the figures of the drawings indicate like parts.

My invention relates to the class of harvesters known as headers; and consists of an adjustable platform or frame carrying the sickle-bar, apron, and reel, in combination with an elevator-frame fixed upon the main frame, to which main frame the tongue is rigidly attached, so as to shorten the draft, or bring it nearer to the sickle-bar. The apron of the elevator-frame is arranged so as to have its movement distinct and separate from the movement of the apron of the platform without interfering with a proper delivery of the grain from one apron to the other; also, in the combination of a detachable grain-carrier, stationary elevator-frame, and pivotal supports attached to a binders' receiving-table constructed upon the main frame, having a detachable binders' platform; also, in a sheet-metal pressure-rack hinged or pivoted to the elevator-frame in such a manner that it will adjust itself to the varying thicknesses of grain passing up the elevator, in combination with and overlapping a rack having a hinged connection with the said frame.

The adjustable platform is provided with or carries the sickle-bar A, apron B, and reel C. The end bars of the frame are provided with hinge-plates, which connect rigidly with a rod, $a$, hinged or pivoted in fulcrum-bearings $b\ b$ under the axle-beam D, carrying the wheel E. The tongue F is bolted on the top of the axle, and, extending back to the front of the machine, is again bolted to a short beam, $c$, the inner end of which is bolted to the side of the standard G' of the elevator-apron frame, the opposite or outer end being secured by the brace-plate $d$, which is bolted to it and to the end of the axle-beam extending beyond its intersection with the tongue. The opposite standard G of the elevator-apron frame is bolted on the inside of the axle-beam and against the tongue. These standards G' G, in connection with cross-braces and rollers, form the frame for carrying the elevator-apron, which, as before referred to, is arranged perpendicular to and independent of the adjustable platform. The tongue is strengthened in its connection with the axle by the brace H. The driving-wheel I of the machine is located between the brace-plate $d$ and the tongue, the axle of which has its bearings in journal-boxes attached to the under side of the brace-plate and tongue. Motion is imparted from the said wheel to the sickle-bar through a pitman-rod, $e$, one end of which connects with a pulley, $f$, whose shaft extends across and is secured in suitable bearings under the axle and short beam. A suitable connection is thence made with the driving-wheel. The other end of the pitman-rod is pivoted to the end of lever $g$, which latter extends under the axle, and is connected with the center of the sickle-bar, the said lever having a pivotal bearing in the center of the rear side bar of the adjustable platform, and working between the upper and lower side of the apron B. Apron B, elevator-apron J, and grain-carrier apron K are all operated simultaneously by the pulleys 1 2 3, connected by bands with the main or starting pulley $f$. The lever L, for depressing or elevating the sickle-bar, is attached to a crank-coupling, $i$, which latter is rigidly attached to the end of the hinged or pivotal rod $a$ under the axle. The rear end of this lever is controlled by its connection with a bar, M, pivoted to the tongue, the lever having a staple made to inclose the said bar, and arranged to slide freely up and down on the side thereof, and held in place when the sickle-bar is adjusted to the desired position by a pin put in the proper hole in the bar.

At the junction of lever L with the crank-coupling is attached the lever N, which latter extends forward and through the elongated slots $m$ in the standards of the elevator-apron frame, and forms a bearing or support for the shaft of the reel; the opposite end of which shaft has its bearing in an arm, $o$, attached to a standard connected with the frame of the platform. A brace-rod, $n$, is attached to both levers. The levers thus combined raise or lower the sickle-bar simultaneously with the reel; and, as will be seen, when it is desired to use the machine as a header or a harvester, or to depress or elevate the sickle-bar for any purpose whatsoever, it is accomplished independently of either the elevator tongue or axle, and without interfering with a proper delivery of the grain from the sickle-bar apron to the elevator-apron, the two aprons maintaining a close proximity with each other, so that no grain can pass between or below the ends of either.

Over the driving-wheel is constructed the receiving-table O, supported by bars attached to the standards G' G, and resting on legs secured to the ends of the axle-beam and short beam $c$. The supplemental tables P' P are rigidly attached to a rod passing under the receiving-table, and having a pivotal bearing in the bars supporting the latter. The platform Q is removable, its edge resting upon the ends of the axle-beam and short beam $c$, and supported by hooks which catch into staples in the legs of the receiving-table. Thus, to use the machine as a header, the grain-carrier is attached to the standards G' G, the platform removed, and the tables P' P thrown up in a vertical position (see Figs. 2 and 6) to support the carrier. The tables are held in that position by a pin on the tapering end of each being slipped in a hole in the projecting portion of the brace on each side of the carrier.

To use the machine as a harvester, the grain-carrier is removed, the tables P' P turned down flush with the receiving-table, and the platform attached, and of course the sickle-bar is lowered to the proper position.

The sheet-metal pressure-rack S has a hinged or pivotal connection with the standards G' G of the elevator-frame by means of a wire, $s$, passed through a hole near the edge on each side of the rack, and bent in such a manner, where it connects with the standards, that the rack will by its own gravity adjust itself automatically to the varying thicknesses of the grain passing upon the elevator-apron. This rack overlaps another rack, T, having a hinged connection with a wire support, $u$, attached to the frame of the sickle-bar; and, of course, in the adjustment of the latter, rack T slides freely upon and independent of rack S.

Having thus fully described my invention, what I claim therein as new, and desire to secure by Letters Patent, is—

1. An adjustable platform or frame carrying the sickle-bar, apron, and reel, in combination with an elevator-frame fixed upon the main frame, and having its apron constructed to operate distinct and separate from the apron of the platform, substantially as and for the purpose set forth.

2. The frame of the sickle-bar, apron, and reel, rigidly attached by hinge-plates to a rod, $a$, swung in fulcrum-bearings under the axle, in combination with a crank-coupling, $i$, levers L N, brace-rod $n$, tongue F, and standards G' G, provided with slots $m$, substantially as set forth.

3. The combination of the detachable grain-carrier K, stationary elevator-frame, and pivotal supports P' P, substantially as and for the purposes set forth.

4. The sheet-metal pressure-rack, hinged or pivoted to the elevator, in combination with and overlapping a rack having a hinged connection with a wire support attached to the adjustable frame, substantially as and for the purpose set forth.

In testimony that I claim the foregoing I have hereunto set my hand this 25th day of June, 1874.

SIDNEY S. STULTZ.

Witnesses:
FRANK KERKARD,
WILLIAM MARTIN.